United States Patent
Shirlen et al.

(10) Patent No.: US 8,839,460 B2
(45) Date of Patent: Sep. 16, 2014

(54) METHOD FOR SECURELY COMMUNICATING INFORMATION ABOUT THE LOCATION OF A COMPROMISED COMPUTING DEVICE

(75) Inventors: Martyn Ryan Shirlen, Wake Forest, NC (US); Richard Gerard Hofmann, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 12/208,626

(22) Filed: Sep. 11, 2008

(65) Prior Publication Data

US 2009/0228981 A1 Sep. 10, 2009

Related U.S. Application Data

(63) Continuation-in-part of application No. 12/044,409, filed on Mar. 7, 2008.

(51) Int. Cl.
*G06F 11/00* (2006.01)
*G06F 21/55* (2013.01)
*G06F 21/88* (2013.01)
*G06F 21/73* (2013.01)
*H04L 29/06* (2006.01)

(52) U.S. Cl.
CPC .......... *H04L 63/1441* (2013.01); *G06F 21/554* (2013.01); *G06F 21/88* (2013.01); *G06F 21/55* (2013.01); *G06F 21/73* (2013.01)
USPC .......................................................... 726/34

(58) Field of Classification Search
CPC .................................................. H04L 63/1441

USPC ........ 709/217, 224, 227; 726/23; 713/23, 150
See application file for complete search history.

(56) References Cited

U.S. PATENT DOCUMENTS

| | | | |
|---|---|---|---|
| 5,748,084 A * | 5/1998 | Isikoff ...................... 340/568.1 |
| 5,919,258 A | 7/1999 | Kayashima et al. |
| 6,021,493 A | 2/2000 | Cromer et al. |
| 6,338,140 B1 * | 1/2002 | Owens et al. ................. 713/168 |
| 7,054,594 B2 * | 5/2006 | Bloch et al. .................. 455/41.2 |
| 7,088,237 B2 | 8/2006 | Arcens |
| 7,346,922 B2 * | 3/2008 | Miliefsky .......................... 726/3 |

(Continued)

FOREIGN PATENT DOCUMENTS

| | | |
|---|---|---|
| CN | 1438784 A | 8/2003 |
| CN | 1698047 A | 11/2005 |

(Continued)

OTHER PUBLICATIONS

Stephen Bloch,Saban Demirbasa and Alistair Curry, Data Security Device, UK Patent GB,2,377,788 BPages 1-36.*

(Continued)

*Primary Examiner* — Teshome Hailu
*Assistant Examiner* — Abiy Getachew
(74) *Attorney, Agent, or Firm* — Nicholas J. Pauley; Peter Michael Kamarchik; Joseph Agusta

(57) ABSTRACT

A method for securely reporting location information after an attack on a computing device is presented. Such information may be reported to a requesting entity in a manner almost transparent to an attacker. Several exemplary embodiments of systems wherein the method may be used are presented.

22 Claims, 4 Drawing Sheets

(56) References Cited

U.S. PATENT DOCUMENTS

| | | | |
|---|---|---|---|
| 7,761,910 B2 * | 7/2010 | Ransom et al. | 726/6 |
| 7,853,803 B2 | 12/2010 | Milliken | |
| 8,068,638 B2 * | 11/2011 | Malone et al. | 382/100 |
| 2002/0108058 A1 | 8/2002 | Iwamura | |
| 2002/0154777 A1 * | 10/2002 | Candelore | 380/258 |
| 2003/0004689 A1 * | 1/2003 | Gupta et al. | 702/188 |
| 2003/0084321 A1 | 5/2003 | Tarquini et al. | |
| 2003/0084349 A1 * | 5/2003 | Friedrichs et al. | 713/201 |
| 2003/0126472 A1 * | 7/2003 | Banzhof | 713/201 |
| 2003/0212910 A1 | 11/2003 | Rowland et al. | |
| 2005/0015624 A1 * | 1/2005 | Ginter et al. | 713/201 |
| 2005/0125689 A1 * | 6/2005 | Snyder | 713/200 |
| 2005/0210532 A1 | 9/2005 | Winick | |
| 2005/0289641 A1 | 12/2005 | Miura et al. | |
| 2006/0194594 A1 * | 8/2006 | Ruutu et al. | 455/456.5 |
| 2006/0212270 A1 * | 9/2006 | Shiu et al. | 702/188 |
| 2007/0223432 A1 * | 9/2007 | Badarinath | 370/338 |
| 2007/0294369 A1 | 12/2007 | Ginter et al. | |
| 2008/0034404 A1 * | 2/2008 | Pereira et al. | 726/2 |
| 2008/0112551 A1 * | 5/2008 | Forbes et al. | 379/142.1 |
| 2008/0318548 A1 * | 12/2008 | Bravo et al. | 455/411 |
| 2009/0080408 A1 | 3/2009 | Natoli et al. | |
| 2009/0228698 A1 | 9/2009 | Shirlen et al. | |
| 2011/0208864 A1 * | 8/2011 | St. Laurent et al. | 709/226 |

FOREIGN PATENT DOCUMENTS

| | | |
|---|---|---|
| CN | 1820262 A | 8/2006 |
| EP | 1630711 A1 | 3/2006 |
| GB | 2377788 | 1/2003 |
| JP | 2003228552 A | 8/2003 |
| JP | 2004334330 A | 11/2004 |
| JP | 2006048134 A | 2/2006 |
| JP | 2007188437 A | 7/2007 |
| JP | 2007219685 A | 8/2007 |
| JP | 2011517804 | 6/2011 |
| KR | 2013086387 A | 8/2013 |
| WO | WO0193531 | 12/2001 |

OTHER PUBLICATIONS

Anonymous: "Alert Standard Format Spedfication"[Online] Apr. 23, 2003, XP002449695 Distributed Management Task Force Retrieved from the Internet: URL:http://www.dmtf.org/standards/documents/ASF/DSP0136.pdf> [retrieved on Sep. 6, 2007] p. 28-p. 32.

Case J et al: "RFC 1157—A Simple Network Management Protocol"[Online] 1990, pp. 1-37, XP002312268 IETF Retrieved from the Internet: URL:http://tools.ietf.org/html/rfcl157> [retrieved on Jul. 2, 2010] paragraph [4.1.2]—paragraph [4.1.4].

International Search Report and Written Opinion—PCT/US2009/056074, International Search Authority—European Patent Office—Nov. 27, 2009.

Marko Jahnke et al: "A Robust SNMP Based Infrastructure for Intrusion Detection and Response in Tactical MANETs" Jan. 1, 2006, Detection of Intrusions and Malware & Vulnerability Assessment Lecture Notes in Computer Science (LNCS), Springer, Berlin, DE, XP019049528 Isbn: 978-3-540-36014—8pages 164-180, p. 7, paragraph 4—p. 8.

Stallings W: "SNMPv3: A security enhancement for SNMP" IEEE Communications Surveys, vol. 2, No. 1, Jan. 1, 1998, pp. 2-17, XP011285207 IEEE, New York, NY, US ISSN: 1553-877X the whole document.

Taiwan Search Report—TW098130806—TIPO—Apr. 12, 2013.

\* cited by examiner

METHOD FOR SECURELY COMMUNICATING INFORMATION ABOUT THE LOCATION OF A COMPROMISED COMPUTING DEVICE

CROSS-REFERENCE TO RELATED APPLICATION

This application is a continuation-in-part of prior application Ser. No. 12/044,409, filed Mar. 7, 2008.

FIELD OF DISCLOSURE

The present disclosure is generally related to security and specifically to securely communicating location information about a computing device that has been compromised or hacked.

BACKGROUND

As computing devices have become more complex, they have also become more feature-rich. Devices such as cellular phones now contain sophisticated processors and are capable of performing such tasks as video and audio playback, electronic banking and secure information storage. Hardware, service, content and software providers all have vested interests in protecting their assets from unauthorized access or tampering. For example, a cellular phone provider may want to restrict access to certain "premium" phone features such as video or audio content. Given the large investment by such companies and the quantity and type of information stored in devices such as cellular phones, it is important to be able to prevent unauthorized copying, distribution or access to data.

There are a number of common methods used to gain unauthorized access to a computing device, including: using an improperly disabled or non-disabled test interface port such as a Joint Test Action Group (JTAG) port; purposefully operating the computing device outside its designed temperature or voltage tolerances; altering traces or adding components to the printed circuit board to which the computing device is attached; and various types of software attacks. It is possible to provide both hardware and software for detecting and mitigating the effects of these and other types of attacks. It is advantageous to be able to differentiate between types of attacks to allow different responses by a system with which the computing device communicates. It is also advantageous to be able to provide notice that a device has been the subject of an attack without alerting the attacker to the fact that the attack has been detected.

SUMMARY OF THE DISCLOSURE

It is understood that other embodiments of the teachings herein will become apparent to those skilled in the art from the following detailed description, wherein various embodiments of the teachings are shown and described by way of illustration. As will be realized, the teachings herein are capable of other and different embodiments without departing from the spirit and scope of the teachings. Accordingly, the drawings and detailed description are to be regarded as illustrative in nature and not as restrictive.

BRIEF DESCRIPTION OF THE DRAWINGS

Various aspects of the teachings of the present disclosure are illustrated by way of example, and not by way of limitation, in the accompanying drawings, wherein.

DETAILED DESCRIPTION

The detailed description set forth below, in connection with the appended drawings, is intended as a description of various exemplary embodiments of the teachings of the present disclosure and is not intended to represent the only embodiments in which such teachings may be practiced. The detailed description includes specific details for the purpose of providing a thorough understanding of the teachings by way of illustration and not limitation. It will be apparent to those skilled in the art that the teachings of the present disclosure may be practiced in a variety of ways. In some instances, well known structures and components are described at a high level in order to avoid obscuring the concepts of the present disclosure.

In one or more exemplary embodiments, the functions and blocks described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 1:
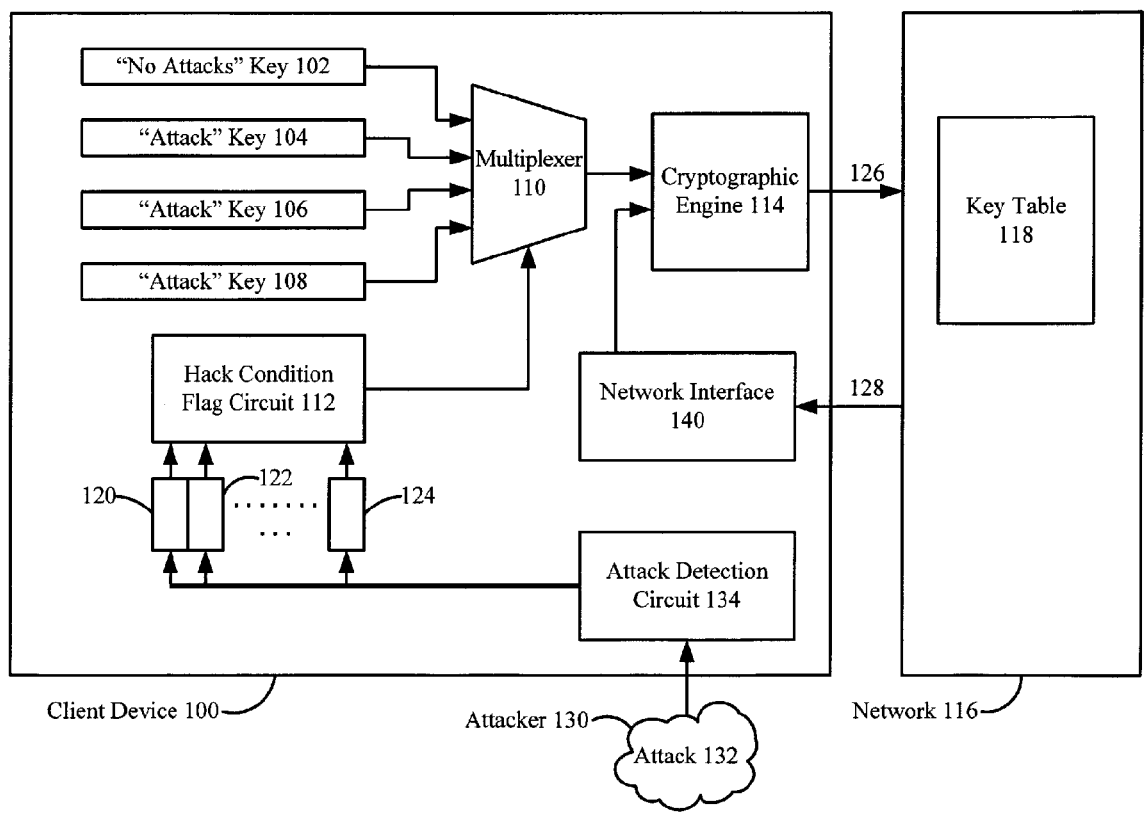
FIG. 1 is a block diagram of an embodiment.

FIG. 1 illustrates an exemplary embodiment of a Computing Device 100 incorporating an Attack Detection Block 134.

The Computing Device 100 is coupled to a Requesting Entity 116 via a Reverse Link 126 and a Forward Link 128. The Reverse Link 126 and Forward Link 128 may be a variety of connections including but not limited to Ethernet, wireless Ethernet or a cellular wireless network protocol such as CDMA or GSM. The Computing Device 100 receives communications from the Requesting Entity 116 via the Forward Link 128 through an Interface 140.

The Requesting Entity 116 forms a request in a Request Formation Block 152. The request contains the identity of the device the request is directed to. In lieu of an explicit identity the request may be directed to a group of devices or all devices which can receive the request. Additionally the request may set up a schedule for the requested devices to report or may implement any other reporting and scheduling mechanism as the needs of a particular implementation dictate.

The Request Formation Block 152 may be a dedicated circuit, a general-purpose processor, a software program or any other suitable processing mechanism. The request may include a non-deterministic value generated by an entropy source including but not limited to a look-up table or a thermal noise generator. The Requesting Entity 116 provides the request over the Forward Link 128. Depending on the level of security desired, the request may be sent in the clear or may be mathematically transformed by methods including, but not limited to, masking or use of a cryptographic algorithm.

In one embodiment, the Computing Device 100 receives the request including a non-deterministic value at the Interface 140 from the Requesting Entity 116 over the Forward Link 128. The Interface 140 provides the non-deterministic value to a Cryptographic Engine 114. The Cryptographic Engine 114 is adapted to perform a mathematical transformation on information, thereby obscuring that information to a third-party observer. The mathematical transformation performed by the Cryptographic Engine 114 may be but is not limited to a cryptographic hash function (such as MD5, SHA-1 or SHA-3) or a cipher algorithm (such as triple-DES or AES ciphers). The Cryptographic Engine 114 may be implemented as a dedicated hardware block, a general-purpose processor capable of performing cryptographic computations or a software program contained in a computer-readable medium. The Cryptographic Engine 114 generates a transformed key by combining the response key provided by a Key Selection Block 110 with the non-deterministic value and performing the mathematical transformation on the combination of the response key and the non-deterministic value. Because the transformed key is based on the non-deterministic value and the response key, the identity of the response key used in the transformation will be virtually undecipherable to an attacker who can observe the transformed key. Determining the response key from the transformed key is a computationally difficult problem, which makes the response key more undecipherable to an attacker. Using a non-deterministic value as part of the request and response ensures that the transformed key will not always be the same even when reporting the same type of attack. The computing device then transmits the transformed key to the Requesting Entity 116 over the Reverse Link 126.

The Requesting Entity 116 computes a list of possible transformed key values based on each Programmed Hardware Key 102-108, which it may have stored previously or received from the Computing Device 100 and stores the possible transformed key values in a Key Table 118. The Requesting Entity 116 may compute the list of possible transformed key values prior to transmitting the request, in parallel with transmitting the request or after the Requesting Entity 116 has received the transformed key back from the Computing Device 100. The Requesting Entity 116 receives the transformed key from the Computing Device 100 over the Reverse Link 126 at a Comparison Block 150. The Comparison Block 150 may be a dedicated circuit, a general-purpose processor or a software program. In Comparison Block 150, the Requesting Entity 116 compares the transformed key to the possible transformed key values stored in the Key Table 118. The Requesting Entity 116 is thus able to determine whether or not the Computing Device 100 has been attacked by the particular transformed key received from the Computing Device 100. The Requesting Entity 116 is also able to gain information about the type of attack based on the particular transformed key received from the Computing Device 100.

When an Attacker 130 executes an Attack 132 on the Computing Device 100, the Attack 132 is detected by the Attack Detection Block 134. The Attack Detection Block 134 sets at least one of the plurality of Hack Condition Indicators 120-124 based on the type of attack detected, and may be adapted to select the "No Attacks" Key 102 as the default key. The Hack Condition Flag Block 112 controls the output of the Key Selection Block 110 in response to the states of the Hack Condition Indicators 120-124. Based on the states of the Hack Condition Indicators 120-124, the Hack Condition Flag Block 112 generates a control signal that enables the Key Selection Block 110 to select one of the plurality of Programmed Hardware Keys 102-108 as a response key and provide it to the Cryptographic Engine 114. This response key embodies the identity of the Computing Device 100, whether or not an attack has been detected, and if an attack has been detected, the type of attack detected.

The Computing Device 100 contains a plurality of Programmed Hardware Keys 102-108. These include a "No Attacks" Key 102 and a plurality of "Attack" Keys 104-108 which are used to identify the type of attack and to authenticate the Computing Device 100 when challenged by the Requesting Entity 116. The "No Attacks" Key 102 and the plurality of "Attack" Keys 104-108 are coupled to Key Selection Block 110. A Hack Condition Flag Circuit 112 is coupled to a plurality of Hack Condition Indicators 120-124 and has an output which is coupled to the multiplexer 110. The Attack Detection Block 134 is coupled to the plurality of Hack Condition Indicators 120-124. The Cryptographic Engine 114 is responsive to an output of the Key Selection Block 110 and an output of the Interface 140. The Cryptographic Engine 114 transforms a value provided by the Requesting Entity 116 based on the output of the Key Selection Block 110. The value may contain other information also if so desired. The transformed key is then transmitted to the Requesting Entity 116 over the Reverse Link 126.

The "No Attacks" Key 102 is used when the Attack Detection Block 134 has not detected any attacks on the Computing Device 100. The plurality of "Attack" Keys 104-108 correspond to particular types of detected attacks. Each of the plurality of Programmed Hardware Keys 102-108 can both identify the Computing Device 100 and communicate the attack status of the Computing Device 100. The plurality of hardware keys 102-108 may be programmed in a variety of ways, including but not limited to electronic fusing at the time of production, non-volatile RAM programmed at the time of production or non-volatile RAM programmed by the Requesting Entity 116 when the Computing Device 100 connects to the Requesting Entity 116.

Each of the Hack Condition Indicators 120-124 is correlated with one of the "Attack" Keys 104-108. In one embodiment, the Hack Condition Indicators 120-124 may contain volatile storage elements such as static RAM or latches. In another embodiment, the Hack Condition Indicators 120-124 may contain non-volatile storage elements such as hardware fuses that are permanently blown. Those skilled in the art will recognize that embodiments combining volatile and non-volatile storage elements are possible and that other types of volatile and non-volatile storage elements may also be used. Although in this particular embodiment only three attack keys and hack condition indicators are illustrated, those skilled in the art will recognize that there may be any number of such "attack" keys and indicators, and they may correspond to any type of detectable attack or to an unknown attack.

A factor to consider in choosing whether to use volatile or non-volatile storage elements for particular hack condition indicators is the perceived seriousness of a particular kind of attack. Types of attacks that are perceived as less serious could be indicated using volatile storage elements, while types of attacks that are considered more serious could be indicated using non-volatile storage elements. In an exemplary embodiment, attacks targeting the security of the device such as attacks on the physical package, attempts to use a test interface such as a JTAG interface or a number of authentication failures above a predetermined threshold might be considered more serious and be indicated by blown hardware fuses while attacks which gain access to restricted features such as video or audio playback might be considered less serious and be indicated by setting static RAM bits that re-set when the cellular phone is power-cycled. Those skilled in the art will realize that for different types of computing devices, different factors including but not limited to data sensitivity and potential financial loss from an attack may be relevant.

In one exemplary embodiment, the Computing Device 100 could be incorporated into a cellular phone. The Requesting Entity 116 could be the cellular network with which the cellular phone communicates. The "attack" keys could represent common attacks on cellular phone devices, including attempting to access a JTAG interface, taking the device outside its normal temperature or voltage ranges, attempting to execute untrusted code on the cellular phone's processor, attempting to gain access to features the user has not paid for, or operating the phone on an unauthorized network. The network provider could then take actions based on the type of attack such as, but not limited to denying the compromised phone access to the network, disabling certain software or features the user has not paid for, logging the location of the compromised phone, or logging information about the type of phone compromised.

In another exemplary embodiment, the Computing Device 100 could be coupled with an engine control computer of a vehicle. The Requesting Entity 116 could be maintained by the vehicle's manufacturer or a third party. In this case, the "attack" keys would represent conditions such as modified engine management software, speed above a certain threshold, whether the vehicle has been reported stolen, or long mileage intervals between required maintenance checks. The vehicle manufacturer could use that information to determine when warranty conditions had been violated or to provide more accurate information about vehicle usage to their service personnel.

Figure 2:
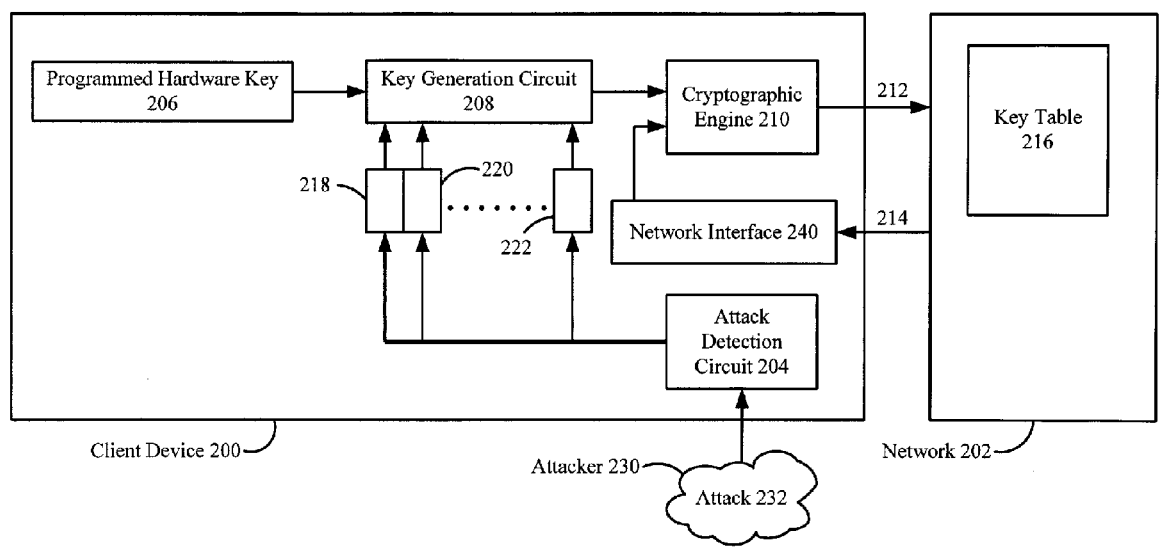
FIG. 2 is a block diagram of another embodiment.

FIG. 2 illustrates another embodiment of a Computing Device 200 which incorporates an Attack Detection Block 204. The Computing Device 200 is coupled to a Requesting Entity 202 via Reverse Link 212 and Forward Link 214. The Reverse Link 212 and Forward Link 214 may be a variety of connections including but not limited to ethernet, wireless ethernet or a cellular wireless network protocol. The Computing Device 200 receives communications from the Requesting Entity 202 via the Forward Link 214 at an Interface 240. The Computing Device 200 contains a Programmed Hardware Key 206 which is used to authenticate the Computing Device 200 when challenged by the Requesting Entity 202. The Attack Detection Block 204 is coupled to a plurality of Hack Condition Indicators 218-222. The Programmed Hardware Key 206 and the Hack Condition Indicators 218-222 are coupled to a Key Generation Block 208. The Key Generation Block 208 and the Interface 240 are coupled to a Cryptographic Engine 210.

When an Attacker 230 makes an Attack 232 on the Computing Device 200, the Attack 232 is detected by the Attack Detection Block 204. In response to an Attack 232, the Attack Detection Block 204 sets one or more Hack Condition Indicators 218-222. The Attack Detection Block 204 may be configured to detect attacks such as but not limited to JTAG port attacks, voltage or temperature attacks, malicious software attacks, unauthorized use, attempts to access sensitive information or denial of service attacks. The Hack Condition Indicators 218-222 may be volatile storage elements such as static RAM or latches, or they may be non-volatile storage elements such as non-volatile RAM or hardware fuses. Those skilled in the art will recognize that embodiments combining volatile and non-volatile storage elements may also be used. Although in this particular embodiment only three hack condition indicators are illustrated, those skilled in the art will recognize that there may be any number of such "attack" indicators, and they may correspond to any type of detectable attack or to an unknown attack.

The Key Generation Block 208 combines the Programmed Hardware Key 206 and the Hack Condition Indicators 218-222 into a response key that communicates the identity of the Computing Device 200 and information about any attacks against the Computing Device 200 to the Requesting Entity 202. For example, this may be accomplished by appending the Hack Condition Indicators 218-222 to the Programmed Hardware Key or by generating an encoding based on the state of the Hack Condition Indicators 218-222 and combining that encoding with the Programmed Hardware Key. Those skilled in the art will recognize that many different methods of combining the Programmed Hardware Key 206 and the Hack Condition Indicators 218-222 that preserve all the information contained in each exist, and the methods herein are presented by way of illustration and not limitation. After the Key Generation Block 208 has combined the Programmed Hardware Key 206 and the Hack Condition Indicators 218-222 to generate a response key, the Key Generation Block 208 provides the response key to the Cryptographic Engine 210.

The Requesting Entity 202 forms a request in a Request Formation Block 252. The Request Formation Block 252 may be a dedicated circuit, a general-purpose processor or a software program. The request may include a non-deterministic value generated by an entropy source including but not limited to a look-up table or a thermal noise generator. The Requesting Entity 202 provides the request over the Forward Link 214. Depending on the level of security desired, the request may be sent in the clear or may be mathematically transformed by methods including, but not limited to, masking or use of a cryptographic algorithm.

The Computing Device 200 receives the request including a non-deterministic value from the Requesting Entity 202 over the Forward Link 214 at the Interface 240. The Interface 240 provides the non-deterministic value to the Cryptographic Engine 210. The Cryptographic Engine 210 may be a dedicated hardware block, a general-purpose processor capable of performing cryptographic computations or a software program contained in a computer-readable medium. The Cryptographic Engine 210 then generates a transformed key by combining the response key with the non-deterministic value received by the Computing Device 200 from the Requesting Entity 202 and mathematically transforming the combination. The Cryptographic Engine 210 may use mathematical transformations including, but not limited to cryptographic hash functions or cipher algorithms. The Computing Device 200 provides the transformed key to the Requesting Entity 202 over the Reverse Link 212.

The Requesting Entity 202 computes a list of possible values based on each possible value of the transformed key and stores the values in a Key Table 216. The Requesting Entity 202 may compute the list of possible values prior to transmitting the random value, in parallel with transmitting the random value or after the Requesting Entity 202 has received the transformed key back from the Computing Device 200. The Requesting Entity 202 receives the transformed key from the Computing Device 200 over the Reverse Link 212 at a Comparison Block 250. The Comparison Block 250 may be a dedicated circuit, a general-purpose processor or a software program. In the Comparison Block 250, the Requesting Entity 202 compares the transformed key to the values stored in the Key Table 216. The Requesting Entity 202 is thus able to determine whether or not the Computing Device 200 has been attacked from the particular transformed key received from the Computing Device 200. The Requesting Entity 202 is also able to gain information about the type of attack based on the particular transformed key received from the Computing Device 200.

Figure 3:
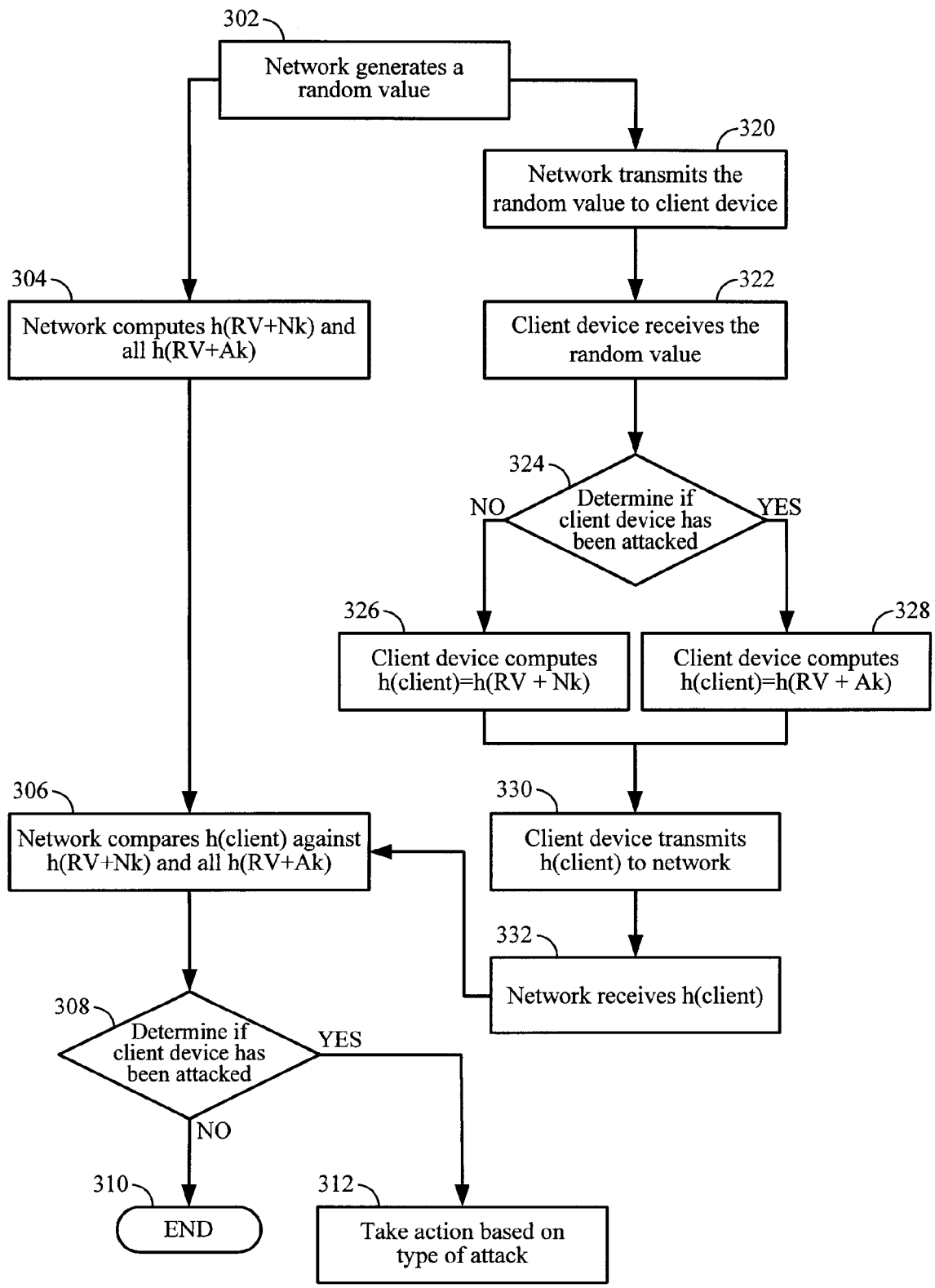
FIG. 3 is a flowchart showing the system design of an embodiment.

FIG. 3 is an exemplary flow diagram illustrating how the Computing Device 100 may respond to a challenge from the Requesting Entity 116. Beginning in block 302, the Requesting Entity 116 generates a request including a non-deterministic value. In block 304, the Requesting Entity 116 computes all possible values of a cryptographic hash function with which the Computing Device 100 could respond and stores those values in the Key Table 118. The Requesting Entity 116 may compute these values before transmitting the request including the non-deterministic value to the Computing Device 100, in parallel with transmitting the request including the non-deterministic value to the Computing Device 100 or after the Requesting Entity 116 has received the transformed key back from the Computing Device 100.

In block 320, the Requesting Entity 116 transmits the request including the non-deterministic value to the Computing Device 100 over the Forward Link 128. In block 322, the Computing Device 100 receives the request including the non-deterministic value at the Interface 140. In decision block 324, the Computing Device 100 evaluates whether it has detected any attacks upon itself. If an attack has not occurred, block 326 is reached. In block 326, the Computing Device 100 computes a value of the cryptographic hash function based on the non-deterministic value received from the Requesting Entity 116 and the "no attacks" key 102. If an attack has occurred, block 328 is reached. At block 328, the Computing Device 100 computes the value of the cryptographic hash function based on the non-deterministic value received from the Requesting Entity 116 and one of the plurality of "attack" keys 104-108. Next, in block 330 the Computing Device 100 transmits the value of the cryptographic hash function back to the Requesting Entity 116 over the Reverse Link 126. In block 332, the Requesting Entity 116 receives the value of the cryptographic hash function from the Computing Device 100.

In block 306, the Requesting Entity 116 compares the value of the cryptographic hash function received from the Computing Device 100 against all the possible values of the cryptographic hash function computed by the Requesting Entity 116 in block 304. Depending on which of the values from block 304 matches the value received in block 332, the Requesting Entity 116 can determine if any and what type of attack occurred and can take action if necessary. If no attacks have been detected, block 310 is reached and the challenge and response is ended. If some type of attack has been detected, in block 312 the Requesting Entity 116 can take action based on the type of attack. Responses to an attack could include denying the compromised computing device access to the network, disabling certain software or features, logging the location of the compromised computing device, or logging information about the type of computing device compromised. Those skilled in the art will realize that many different responses are possible, and those discussed here in the context of the exemplary embodiment are for purposes of illustration and not limitation.

Figure 4:
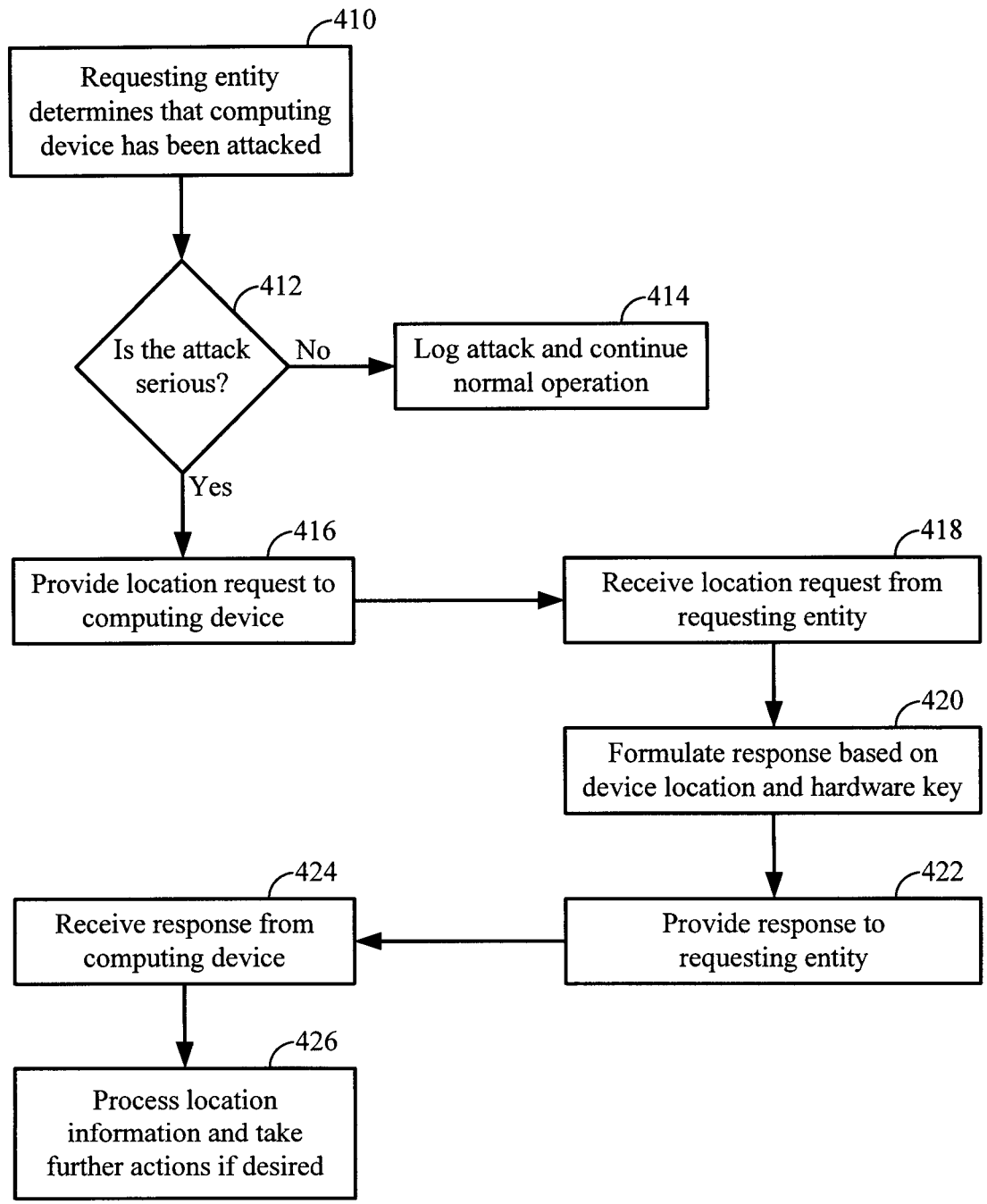
FIG. 4 is a flowchart showing the detection of an attack and the reporting of a client device's location.

FIG. 4 is an exemplary flow diagram illustrating how the Requesting Entity 116 can respond to attacks of varying seriousness. In block 410, the Requesting Entity 116 determines that the Computing Device 100 has been attacked. In block 412, the Requesting Entity 116 determines the seriousness of the attack. The seriousness of the attack can be based on factors including but not limited to the particular feature of the Computing Device 100 that has been compromised, whether the attack was hardware or software based, or whether any of the Computing Device 100 user's personal information stored on the device has been compromised. If the attack is determined not to be serious, block 414 is reached in which the Requesting Entity 116 may take action, including but not limited to logging the attack and continuing with normal operation. If the attack is determined to be serious, block 416 is reached in which the Requesting Entity 116 provides a location request to the Computing Device 100.

In block 418, the Computing Device 100 receives the location request from the Requesting Entity 116. In block 420, the Computing Device 100 formulates a response based on its location and at least a portion of a programmed hardware key. The response may be formulating by methods including but not limited to performing a mathematical transformation such as a one-way hash on the portion of the programmed hardware key and at least a portion of the location information. The location of the Computing Device 100 may be determined, for example, by use of a GPS receiver integrated into the Computing Device 100, virtual GPS or signal triangulation. Those skilled in the art will recognize that other mathematical transformations and methods of determining the location of the Computing Device 100 may be used. The response may be sent in the clear or alternatively it may be encrypted. Once the Computing Device 100 has formulated the response, in block 422 it provides the response back to the Requesting Entity 116.

In block 424, the Requesting Entity 116 receives the response from the Computing Device 100. In block 426, the Requesting Entity 116 can process the location information received in the response including decryption if necessary and take further actions if desired. Such actions may include but are not limited to generating a log, sending an alert or remotely deactivating the Computing Device 100.

While the teachings of the present disclosure are disclosed in the context of unauthorized access to a consumer computing device, it will be recognized that a wide variety of implementations may be employed by persons of ordinary skill in the art consistent with the teachings herein and the claims which follow below.

What is claimed is:

1. A method of securely communicating location information from a computing device, comprising:
   receiving a location request from a requesting entity if it is determined that the computing device has been attacked;
   acquiring location information at the computing device;
   forming a response based on mathematically transforming a combination of a non-deterministic value and at least a portion of the location information and at least a portion of a hardware key; and providing the response to the requesting entity.

2. The method of claim 1, wherein forming the response comprises mathematically transforming the portion of a hardware key and at least a portion of the location information.

3. The method of claim 2, wherein the mathematical transformation is a one-way hash function.

4. The method of claim 1, wherein the location is a geographic location.

5. A method of securely receiving information about a location of a computing device at a requesting entity, comprising:
- forming a location request at the requesting entity if it is determined that the computing device has been attacked; providing the location request to the computing device; receiving a response from the computing device based on a mathematical transformation of a combination of a non-deterministic value and at least a portion of the location of the computing device and at least a portion of a hardware key; and determining the location of the computing device from the response.

6. The method of claim 5, wherein the location request at the requesting entity is formed only if the requesting entity determines that an attack on the computing device is of a serious nature.

7. The method of claim 5, wherein the location is a geographic location.

8. A computing device, comprising: logic configured to receive a location request from a requesting entity, the location
- request based on a determination that the computing device has been attacked; logic configured to acquire location information of the computing device;
- logic configured to form a response based on a mathematical transformation of a combination of a non-deterministic value and at least a portion of the location information and at least a portion of a hardware key; and logic configured to provide the response to the requesting entity.

9. The computing device of claim 8, wherein the response comprises a mathematical transformation of the portion of a hardware key and at least a portion of the location information.

10. The computing device of claim 9, wherein the mathematical transformation is a one-way hash function.

11. A requesting device, comprising: logic configured to form a location request, the location request based on a determination that a computing device has been attacked;
- logic configured to provide the location request to the computing device;
- logic configured to receive a response from the computing device based on a mathematical transformation of a combination of a non-deterministic value and at least a portion of the location of the computing device and at least a portion of a hardware key; and
- logic configured to determine the location of the computing device from the response.

12. The method of claim 11, wherein the location request at the requesting entity is formed only if the requesting entity determines that an attack on the computing device is of a serious nature.

13. A computing device, comprising: means for receiving a location request from a requesting entity,
- the location request based on a mathematical transformation of a combination of a non-deterministic value and at least a portion of a determination that the computing device has been attacked;
- means for acquiring location information at the computing device; means for forming a response based on the location information and at least a portion of a hardware key; and means for providing the response to the requesting entity.

14. The computing device of claim 13, wherein the means for forming the response comprises means for mathematically transforming the portion of a hardware key and at least a portion of the location information.

15. The computing device of claim 14, wherein the mathematical transformation is a one-way hash function.

16. A requesting device, comprising:
- means for forming a location request at the requesting device, the location request based on a determination that the computing device has been attacked;
- means for providing the location request to the computing device;
- means for receiving a response from the computing device based on a mathematical transformation of a combination of a non-deterministic value and at least a portion of the location of the computing device and at least a portion of a hardware key; and
- means for determining the location of the computing device from the response.

17. The requesting entity of claim 16, wherein the location request at the requesting entity is formed only if the requesting entity determines that an attack on the computing device is of a serious nature.

18. A non-transitory computer-readable storage medium comprising code, which, when executed by a processor, causes the processor to perform operations for securely communicating location information from a computing device, the non-transitory computer-readable storage medium comprising:
- code for receiving a location request from a requesting entity, the location request based on a determination that the computing device has been attacked;
- code for acquiring location information at the computing device; code for forming a response based on a mathematical transformation of a combination of a non-deterministic value and at least a portion of the location information and at least a portion of a hardware key; and
- code for providing the response to the requesting entity.

19. The non-transitory computer-readable storage medium of claim 18, wherein the code for forming the response comprises code for mathematically transforming the portion of a hardware key and at least a portion of the location information.

20. The non-transitory computer-readable storage medium of claim 19, wherein the mathematical transformation is a one-way hash function.

21. A non-transitory computer-readable storage medium comprising code, which, when executed by a processor, causes the processor to perform operations for securely receiving information about a location of a computing device at a requesting entity, the non-transitory computer-readable storage medium comprising:
- code for forming a location request at the requesting entity, the location request based on a determination that the computing device has been attacked;
- code for providing the location request to the computing device; code for receiving a response from the computing device based on a mathematical transformation of a combination of a non-deterministic value and at least a portion of the location of the computing device and at least a portion of a hardware key; and
- code for determining the location of the computing device from the response.

22. The non-transitory computer-readable storage medium of claim 21, wherein the location request at the requesting entity is formed only if the requesting entity determines that an attack on the computing device is of a serious nature.

* * * * *